United States Patent [19]
Onigata et al.

[11] Patent Number: 5,508,991
[45] Date of Patent: Apr. 16, 1996

[54] TRACKING ERROR CORRECTION FOR OPTICAL HEAD IN DIFFERENT MODES OF OPERATION

[75] Inventors: Yoshio Onigata; Hiroaki Tsuboi, both of Saitama, Japan

[73] Assignee: Pioneer Electronic Corporation, Tokyo, Japan

[21] Appl. No.: 257,574

[22] Filed: Jun. 9, 1994

Related U.S. Application Data

[63] Continuation of Ser. No. 915,510, Jul. 20, 1992, abandoned.

[30] Foreign Application Priority Data

Nov. 8, 1991  [JP]  Japan .................................. 3-293413

[51] Int. Cl.$^6$ .................................................. G11B 7/00
[52] U.S. Cl. ...................... 369/106; 369/54; 369/44.27; 369/116; 369/44.13; 369/124; 369/275.3
[58] Field of Search ................................ 369/106, 107, 369/124, 126, 44.11, 44.13, 44.25, 44.26, 44.35, 44.29, 44.32, 44.36, 54, 275.3, 44.34, 275.4, 105, 109, 44.27, 116

[56] References Cited

U.S. PATENT DOCUMENTS

| | | | |
|---|---|---|---|
| 4,397,010 | 8/1983 | Nabeshima | 369/44.13 |
| 4,718,054 | 1/1988 | Schell et al. | 369/54 |
| 4,866,688 | 9/1989 | Ohtake et al. | 369/44.13 |
| 5,020,045 | 5/1991 | Smart et al. | 369/44.29 |
| 5,034,940 | 7/1991 | Saito et al. | 369/44.34 |
| 5,084,860 | 1/1992 | Maeda et al. | 369/44.32 |
| 5,270,998 | 12/1993 | Uchiumi | 369/275.3 |
| 5,295,131 | 3/1994 | Ishibashi et al. | 369/275.3 |

OTHER PUBLICATIONS

Patent Abstract of Japan, vol. 13, No. 345 (P–909) 3 Aug. 1989 for Japanese Publication No. JP 1–102747.

*Primary Examiner*—Georgia Y. Epps
*Assistant Examiner*—Kim-Kwok Chu
*Attorney, Agent, or Firm*—Finnegan, Henderson, Farabow, Garrett & Dunner

[57] ABSTRACT

An offset pulse having a polarity opposite to that of a large tracking error pulse that occurs in response to an operation mode changeover is added to a tracking error signal. The offset pulse has a duration starting immediately before the operation mode changeover and partially overlaps with the tracking error pulse. The offset pulse is generated so as to rise at a timing that is determined based on a wobble signal extracted from the tracking error signal.

7 Claims, 6 Drawing Sheets

TRACKING ERROR CORRECTION FOR OPTICAL HEAD IN DIFFERENT MODES OF OPERATION

This application is a continuation of application Ser. No. 07/915,510, filed Jul. 20, 1992, now abandoned.

BACKGROUND OF THE INVENTION

1. Field of the Invention

The present invention relates to an optical head servo device in an optical recording and reproducing apparatus. More specifically, the invention relates to a servo device which performs a servo operation to follow the track of an information recording disc and a temporal variation of a reproduction signal even when the light output power of an optical head is changed over in accordance with the operation modes such as reproduction, recording and erasing.

2. Description of Related Art

FIG. 1 shows a magneto-optical disc recording and reproducing apparatus of the type as is presently known.

In FIG. 1, a magneto-optical disc 1 has tracks separated by grooves, and is coated with a light-reflective magnetic film 2 in which signals are recorded magnetically. The disc 1 is rotated by a motor 3.

A linearly polarized light beam emitted from a semiconductor laser 4 is introduced, via a collimator lens 5, to a beam shaping prism 6, which shapes the elliptical light beam into a circular beam having an isotropic intensity distribution. The light beam output from the beam shaping prism 6 is passed through a beam splitter 7, reflected by a mirror 8, and focused by an objective lens 9 onto the magnetic film 2. While being reflected by the magnetic film 2, the light beam experiences a change (rotation) of its polarization plane in accordance with the signal that is recorded in the magnetic film 2 in the form of a variation of magnetization. The light beam reflected from the magnetic film 2 returns to the objective lens 9, and is introduced to a beam splitter 10 via the mirror 8 and beam splitter 7.

The light beam reflected by the beam splitter 10 is passed through a half-wave plate 11 and a convex lens 12, and input to a polarizing prism 13, where it is separated into P- and S-polarization light beams. The P-polarization light beam passed through the polarizing prism 13 enters a photodetector 14a. The S-polarization light reflected by the polarization prism 13 enters a photodetector 14b. A reproduction signal is obtained based on detection outputs of the photodetectors 14a and 14b.

The light beam transmitted through the beam splitter 10 is input to a 4-segmented photodetector 17 via a convex lens 15 and a cylindrical lens 16. Although a focus error signal and a tracking error signal are generated from a detection output of the 4-segmented photodetector 17, only the tracking error signal is described below. The detection output of the 4-segmented photodetector 17 is provided to a tracking error signal generation circuit 18, which generates a tracking error signal. The tracking error signal generation circuit 18 provides a tracking actuator 19 with a drive signal that is produced in accordance with the tracking error signal. Based on this signal, the tracking actuator 19 performs a fine adjustment of the position in the disc radial direction of the objective lens 9.

FIG. 2 is a block diagram showing a configuration of the tracking error signal generating circuit 18, in which the same parts as in FIG. 1 are represented by the same reference numerals.

In FIG. 2, among outputs of four photodetecting surfaces 17a–17d of the 4-segmented photodetector 17, the outputs of the photodetecting surfaces 17a and 17b are input to an adder 181 while the outputs of the photodetecting surfaces 17c and 17d are input to an adder 182. Respective outputs of the adders 181 and 182 are input to a subtracter 183, where their difference component is extracted as the tracking error signal. The one-dot-chain line drawn on the photodetector 17 in FIG. 2 corresponds to the track direction of the disc 1.

The tracking error signal thus generated is provided to a gain control circuit 184. The gain control circuit 184 amplifies, at a gain in accordance with a control signal, the tracking error signal to a predetermined level. An output signal of the gain control circuit 184 is provided to an equalizer 185. The control signal is to keep the open-loop gain of a tracking servo loop at an approximately constant level in accordance with a radius of the disc 1 that is known from address data recorded on the disc 1. After processed by the equalizer 185, the tracking error signal is provided, via a drive amplifier 18, to the tracking actuator 19 to drive it.

With the configuration as shown in FIGS. 1 and 2, the output power of the semiconductor laser 4 is changed over depending on whether the apparatus is in the reproduction period, recording period or erasing period. More specifically, the laser output power is controlled in the following manner. In the reproduction mode, the laser output power is kept constant, at level 1. During the recording mode, it is changed over between level 1 and level 2 that is higher than level 1 in accordance with an encoded signal to be recorded. During the erasing mode, it is kept at level 2.

While having an advantage that the laser output power is kept constant irrespective of a variation among the discs, this method is associated with a problem that the tracking error includes a transient component that occurs at the time of changing over the laser output power, which is illustrated in FIG. 3.

As shown in FIG. 3, if the laser output power is changed over during one rotation of the disc 1 with the switching of the operation mode in the order of a reproduction mode PB1, a recording/erasing mode REC1, a reproduction mode PB2 and a recording/erasing mode REC2, the tracking error signal takes a waveform as shown in part (a) of FIG. 3. It can be seen that a large-level error signal occurs every time the operation mode is changed over. This will cause an unstable tracking servo operation in the case where the track pitch is smaller than the laser spot diameter.

This problem, which occurs at the time of changing over the laser output power, results from a phenomenon that a wavelength change of the light beam in association with the changing over of the laser output power causes a change of the refractive index of the beam shaping prism 6 that has the function of shaping the elliptical light beam emitted from the semiconductor laser 4 into the circular beam. This refractive index change causes a deviation of the beam incident position on the disc 1 in both of the tracking control direction and the tangential direction, which produces instantaneous, large tracking and tangential errors.

SUMMARY OF THE INVENTION

The present invention has been made in view of the above problems in the art, and has an object of providing a good servo operation which can avoid an instantaneous, large servo error at the time of changing over an output power of a light source.

According to the invention, a servo device in an optical disc apparatus comprises:

an optical head including a light source having a light output power that is controlled in accordance with an operation mode, and an optical system for introducing a light beam emitted from the light source via a beam shaping prism so that the light beam is input to a prescribed position of an optical recording medium in the form of a light spot and for extracting a light beam reflected by the optical recording medium;

means for detecting a variation of the reflected light beam and for generating an error signal indicating a deviation of the light spot from the prescribed position;

means for moving the optical head in accordance with the error signal; and means for applying an offset pulse to the error signal before the changeover of the operation mode.

DESCRIPTION OF THE PREFERRED EMBODIMENT

An embodiment of the present invention is hereinafter described with reference to the accompanying drawings.

Figure 4:
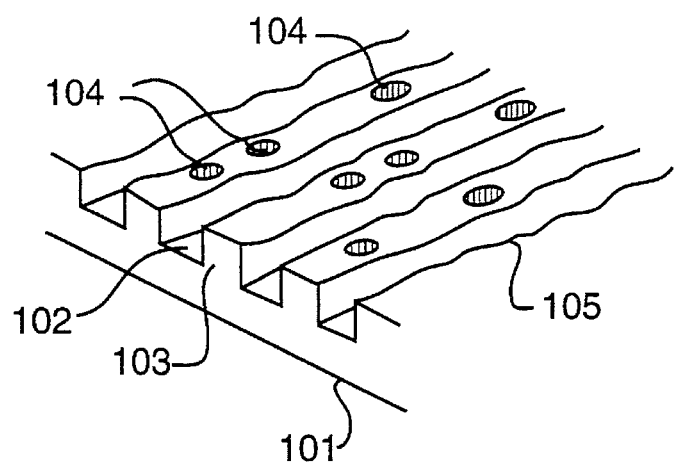
FIG. 4 is a perspective view showing a structure of a magneto-optical disc which is an object of a servo operation of the tracking servo device according to the embodiment.

FIG. 4 shows a structure of a recording disc to be used in combination with a tracking servo device of the embodiment. As shown in FIG. 4, pre-grooves 102 are formed on the recording surface of a rewritable optical disc 101. Pits 104 are formed, i.e., an information signal is recorded by irradiating, with a laser beam, a land portion 103 as a recording track that is located between the pre-grooves 102. In the case of the magneto-optical disc, the pits 104 are formed in the form of inverted magnetization. The wall 105 of the pre-groove 102 has undulations in the direction perpendicular to the track direction, so that an address identification signal (a high-frequency wobble signal) recorded in the form of the undulations is superposed on the low-frequency tracking error signal. The address identification signal is recorded in each unit information signal section called "sector" according to the predetermined format.

Figure 5:
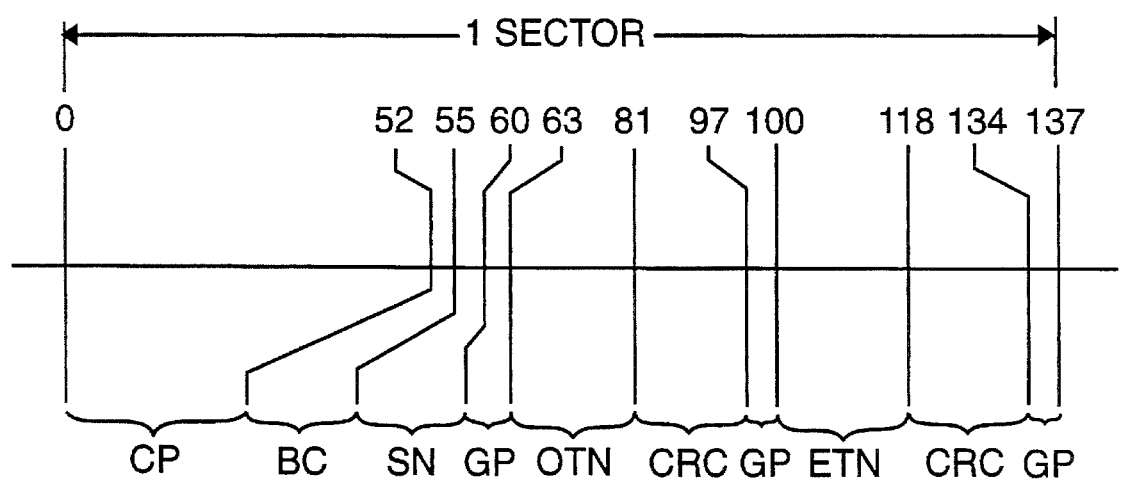
FIG. 5 shows a recording format of a wobble signal on the magneto-optical disc of FIG. 4.

As shown in FIG. 5, one sector consists of 137 bits. One track is divided into 25 sectors for various reasons, such as to make it possible that both NTSC and PAL video format signals are recorded on the disc 101.

FIG. 5 shows a data arrangement format of sectors having a track number among the 25 sectors. In this format, a series of clock pulses is recorded at the rate of 1 clock per bit in a clock pulse area CP of 52 bits (6.5 bytes), which will become a PLL signal for the rotation servo operation during the recording or reproduction of the disc 101. In the similar manner, a 3-bit block sync signal is recorded in an area BS, and a 5-bit sector number (0–24) in an area SN. Areas of 61–63th bits, 98–100th bits and 135–137th bits are gap areas GP, which are no-signal or undetermined waveform areas.

A 18-bit area OTN of 64–81th bits is an area for storing an odd track number, and another 18-bit area ETN of 119–134th bits is an area for storing an even track number. An error detection code pulse is recorded in two redundant bit areas CRC.

Figure 6:
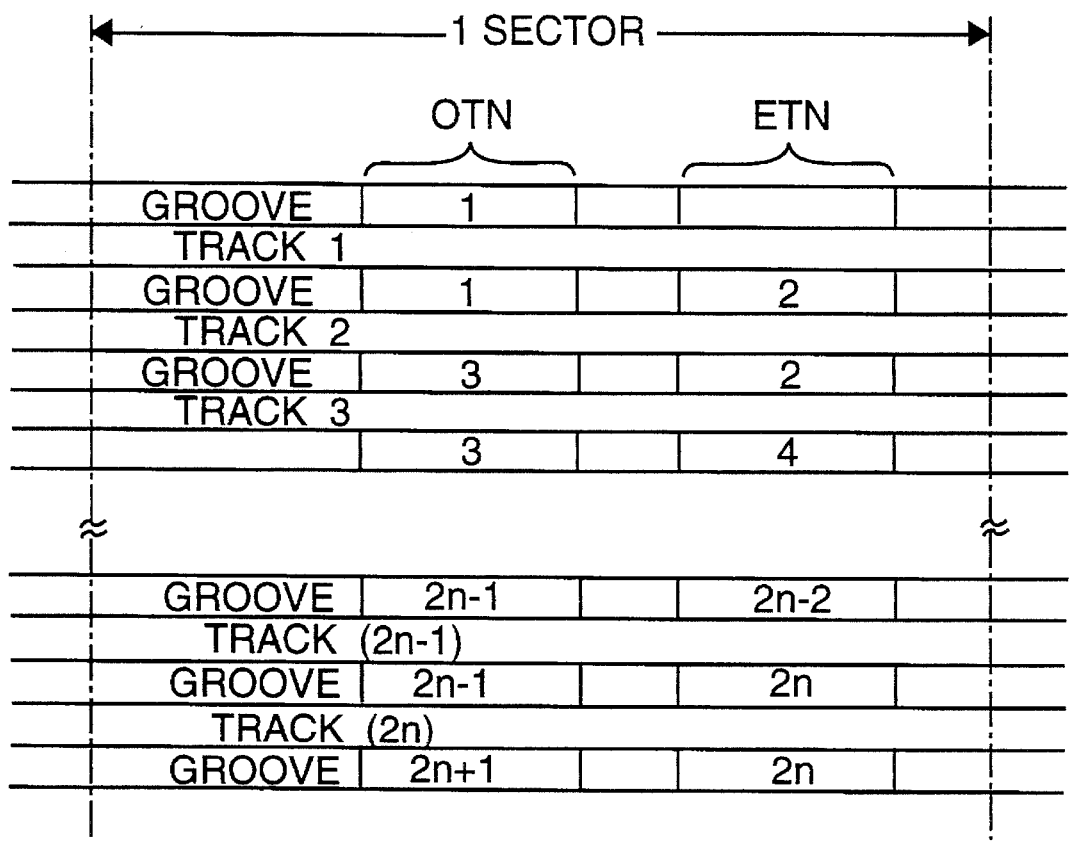
FIG. 6 shows how a track number is actually recorded on the disc according to the format of FIG. 5.

As shown in FIG. 6, in the case of track 1, the track number "1" is recorded in the area OTN of the pre-grooves on both sides of track 1, and no track number is recorded in the area ETN of the pre-groove on one side of track 1 and the track number "2" is recorded in the area ETN of the pre-groove on the other side of track 1. In the case of track 2, the track number "1" is recorded, as described above, in the area OTN of the pre-groove adjacent to track 1, and the track number 3 is recorded in the area OTN of the pre-groove on the opposite side. Further, the track number "2" is recorded in the area ETN of the pre-grooves on both sides of track 2.

In this manner, the correct track number of odd track 2n-1 (n is a natural number) is a number recorded in the area OTN of the pre-grooves on both sides of that track. The correct track number of even track 2n is a number recorded in the area ETN of the pre-grooves on both sides of that track.

Figure 7:
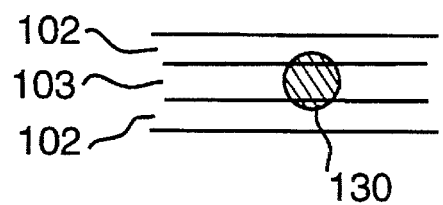
FIG. 7 shows a relationship between a land portion of the disc of FIG. 4 and a light beam incident thereon.

As shown in FIG. 7, a spot 130 of the laser beam incident on the land portion 103 has a diameter larger than the width of the land portion 103.

The optical disc having the above-described structure is disclosed in Japanese Patent Application No. Hei. 2-300671 filed by the present assignee.

Figure 1:
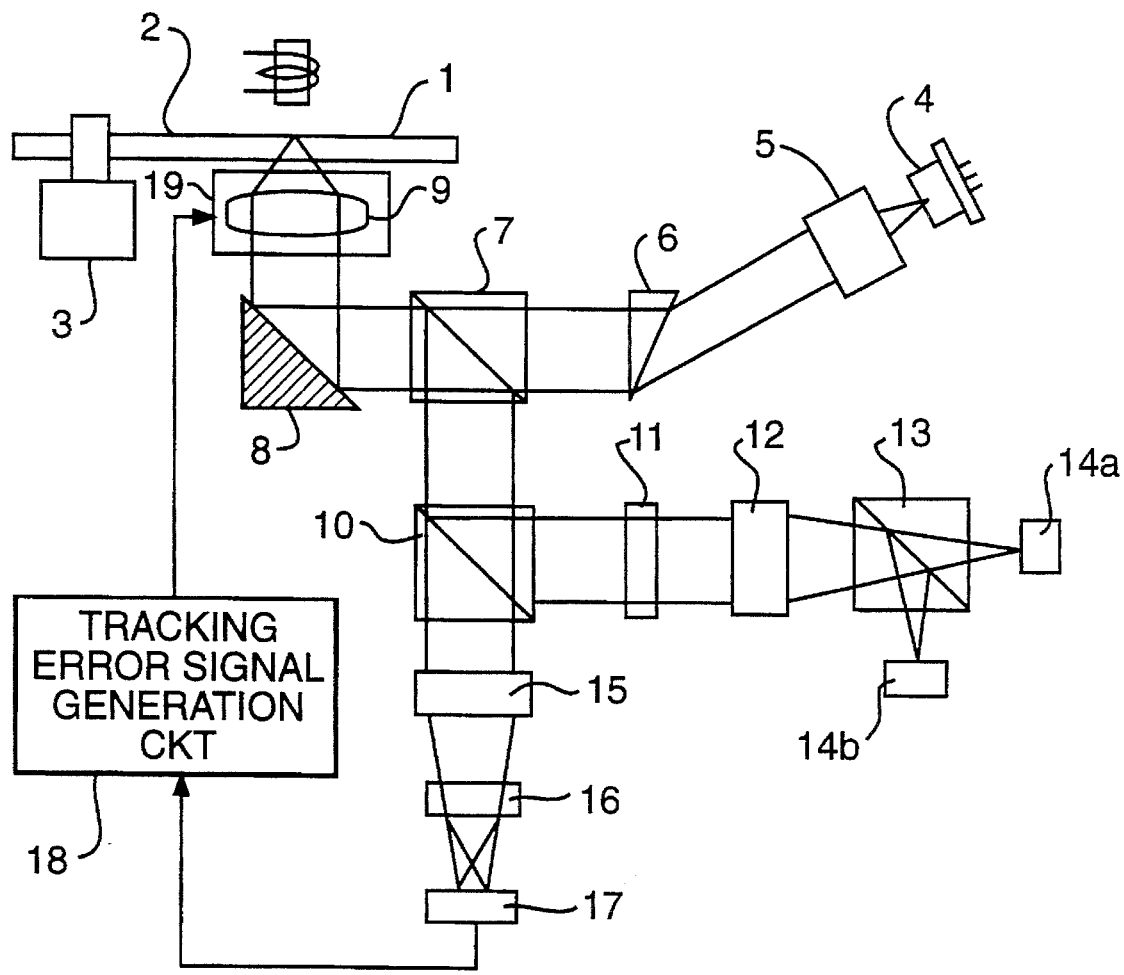
FIG. 1 is a block diagram showing a conventional magneto-optical disc recording and reproducing apparatus.
Figure 2:
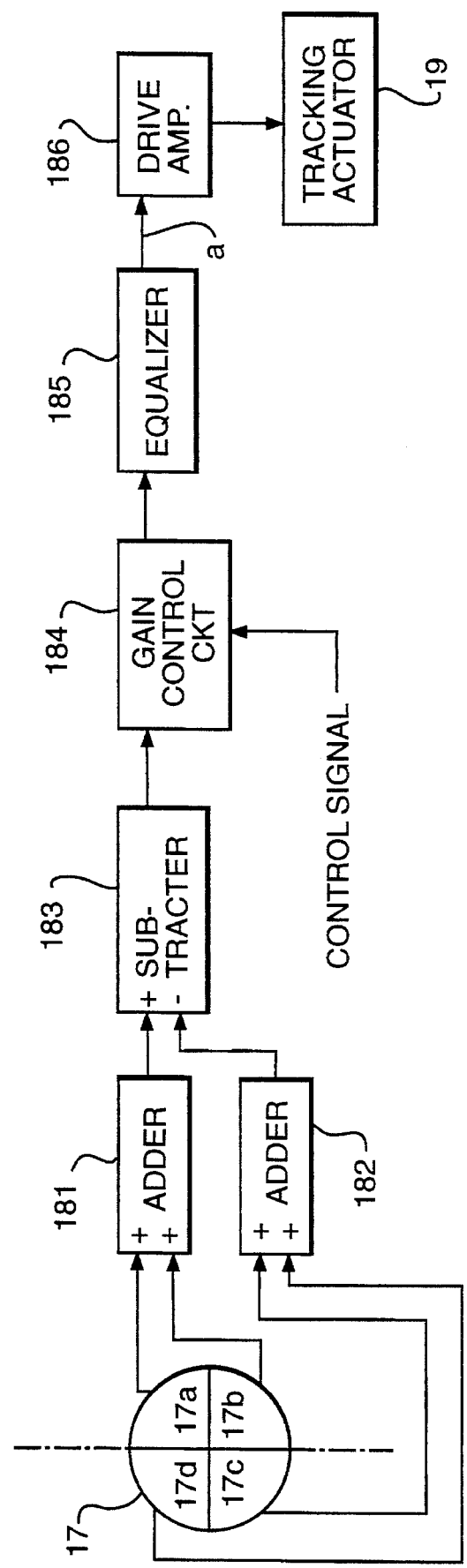
FIG. 2 is a block diagram showing a configuration of a conventional tracking error signal generation circuit.
Figure 8:
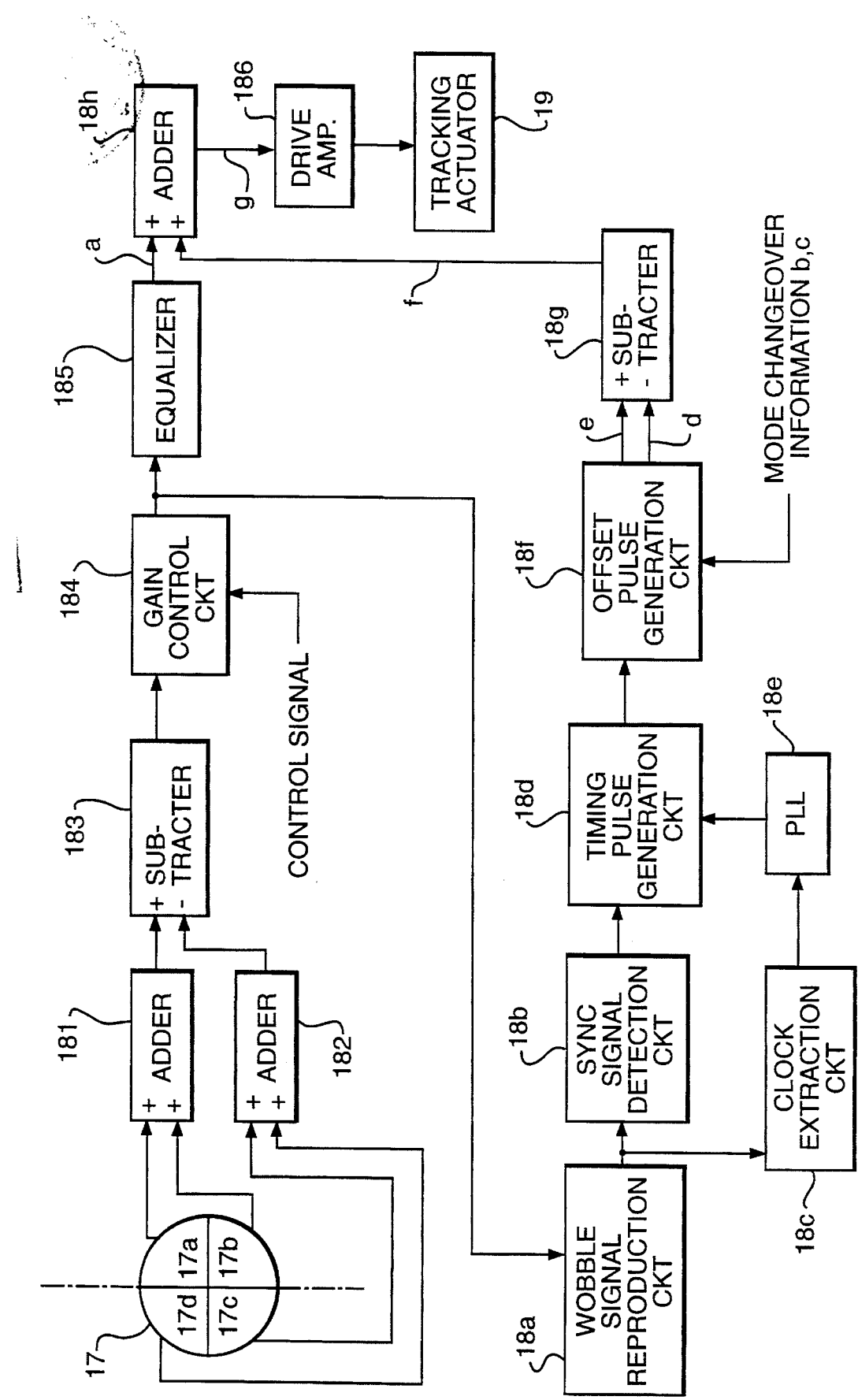
FIG. 8 is a block diagram showing a configuration of a tracking error signal generation circuit according to the embodiment.

The following embodiment of the invention is constituted with the use of the above magneto-optical disc. FIG. 8 is a block diagram showing a tracking servo device for an optical head. In FIG. 8, the parts equivalent to those of FIGS. 1 and 2 are represented by the same reference numerals, and detailed descriptions therefor are omitted below.

In FIG. 8, the tracking error signal output from the gain control circuit 184 is provided to a wobble signal reproduction circuit 18a as well as to the equalizer 185. Based on the received tracking error signal, the wobble signal reproduction circuit 18a reproduces a wobble signal recorded along the tracks of the disc 1 in the form of a wobbled mark. The wobble signal thus reproduced is input to a sync signal detection circuit 18b and a clock extraction circuit 18c.

The sync signal detection circuit 18b detects a block sync signal BS from the reproduced wobble signal, and provides a timing pulse generation circuit 18d with a timing signal that is produced in accordance with the detection timing of the wobble signal. The clock extraction circuit 18c extracts clock pulses CP from the wobble signal, and provides the clock pulses CP to a PLL circuit 18e. The PLL circuit 18e provides the timing pulse generation circuit 18d with a clock signal that is in phase-synchronism with the clock pulses CP. The timing pulse generation circuit 18d is constituted of a counter which counts the clocks of this clock signal while being reset by the above timing signal, and provides an offset pulse generation circuit 18f with a timing pulse indicating a time point at which the count reaches a predetermined value.

The offset pulse generation circuit 18f produces, in accordance with mode changeover information b and c sent from a system controller (not shown), two kinds of offset pulses d and e that are in synchronism with the timing pulse. The offset pulses d and e are input to the inverting and noninverting terminals of a subtracter 18g, respectively. The subtracter 18g provides its subtraction output to an adder 18h.

On the other hand, the tracking error signal is also provided to the adder 18h via the equalizer 185. The adder 18h adds this tracking error signal and the output of the subtracter 18g, and provides an addition output to the drive amplifier 186.

The operation of the above tracking servo device is described below.

Since the wobble signal, i.e., the block sync signal BS and clock pulses CP are recorded on a sector-by-sector basis, the time point at which the count of the timing pulse generation circuit 18d reaches the predetermined value is located at a predetermined position in each sector. Therefore, the timing pulse generation circuit 18d provides the offset pulse generation circuit 18f with one timing pulse per sector.

According to the disc format disclosed in Japanese Patent Application No. Hei. 2-300671 mentioned above, the PCM digital audio signal is inserted in the vertical blanking period of the video signal. As a result, the video signal and the PCM audio signal can be recorded independently, which enables what is called "after recording".

Figure 3:
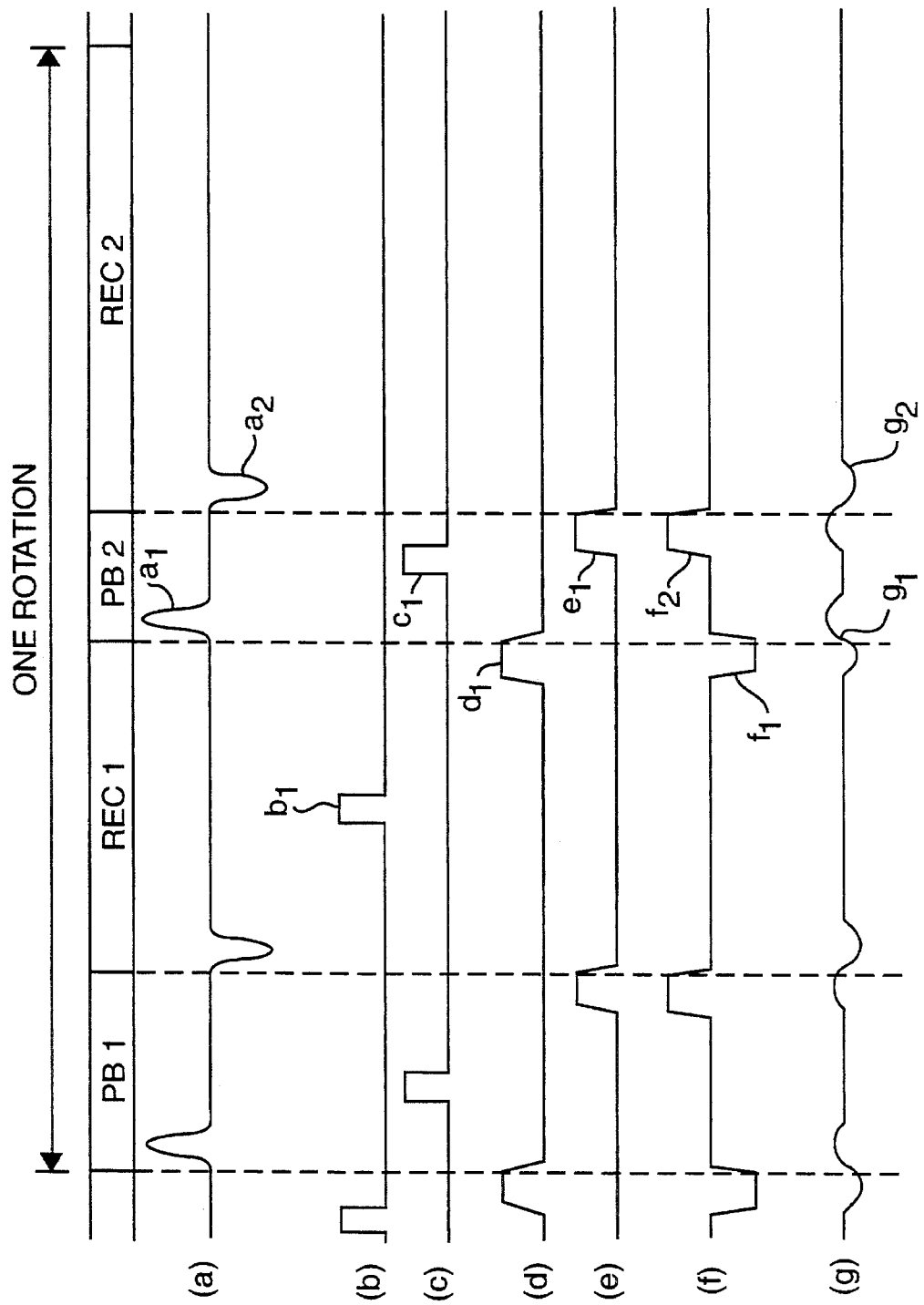
FIG. 3 is a timing chart used for explaining the operation of a conventional tracking servo device and a tracking servo device according to an embodiment of the present invention.

Therefore, where only one of the video signal and PCM digital audio signal is recorded, the periods of the REC mode (recording or erasing mode) and the PB mode (reproduction mode) are mixed in the period of one disc rotation, as shown in FIG. 3.

The system controller generates the mode changeover information b and c during the REC mode period and during the PB mode period, respectively (see parts (b) and (c) of FIG. 3). The mode changeover information b and c is input to the offset pulse generation circuit 18f. The offset pulse generation circuit 18f provides the offset pulses d and e (see parts (d) and (e) of FIG. 3) to the subtracter 18g in response to the timing pulse sent from the timing pulse generation circuit 18d immediately after the issuance of the mode changeover information b and c, i.e., at the timing immediately before the mode changeover.

For example, if a pulse b1 (part (b) of FIG. 3) as the mode changeover information is input to the offset pulse generation circuit 18f, the offset generation circuit 18f generates an offset pulse d1 (part (d) of FIG. 3).

Since no second offset pulse e (part (e) of FIG. 3) occurs at this time point, a negative signal f1 (part (f) of FIG. 3) appears at the output terminal of the subtracter 18g. This signal f1 is added, by the adder 18h, to the tracking error signal (part (a) of FIG. 3) as output from the equalizer 185. While after a lapse of a predetermined time the laser mode is changed over to the reproduction mode PB2, due to the addition of the offset pulse f1 generated immediately before the mode changeover the amplitude of a tracking error signal a1 (part (a) of FIG. 3) is reduced to provide a reduced tracking error signal g1 (part (g) of FIG. 3), which is sent to the drive amplifier 186.

Then, when receiving a recording instruction signal c1 (part (c) of FIG. 3) as the mode changeover signal from the system controller, the offset pulse generation circuit 18f provides an offset pulse e1 (part(e) of FIG. 3) to the noninverting terminal of the subtracter 18g in response to a timing pulse sent from the timing generation circuit 18d immediately after the issuance of the recording instruction signal c1.

Since no first offset pulse d (part (d) of FIG. 3) occurs at this time point, a positive signal f2 (part (f) of FIG. 3) appears at the output terminal of the subtracter 18g. This signal f2 is added, by the adder 18h, to the tracking error signal (part (a) of FIG. 3) as output from the equalizer 185. While after a lapse of a predetermined time the laser mode is changed over to the recording/erasing mode REC2, due to the addition of the offset pulse f2 generated immediately before the mode changeover the amplitude of a tracking error signal a2 (part (a) of FIG. 3) is reduced to provide a reduced tracking error signal g2 (part (g) of FIG. 3), which is sent to the drive amplifier 186.

In this manner, according to the preferred embodiment of the invention, the amplitude of the tracking error signal is reduced by applying to the servo loop a pulse having a predetermined width and such a polarity as drives the tracking actuator to a direction opposite to that by the large-amplitude tracking error signal, which occurs at the time of the changeover, at the time point a predetermined time before the laser power changeover. It was confirmed using an actual servo device that the amplitude of the tracking error signal can be suppressed approximately to a half level. By virtue of the above construction, the servo loop can operate stably even with a narrower track pitch.

Although the above embodiment is described only of the tracking servo operation, the invention is not limited thereto but applicable to the tangential servo operation. A similar advantage can be obtained by applying the similar offset pulse to the tangential error signal at the time of the mode changeover.

As described in the foregoing, in the optical head servo device of the invention, an offset pulse is applied to the error signal by an offset applying means immediately before the mode changeover. As a result, an instantaneous, large servo error, which occurs at the time of changing over the light source output power, can be suppressed to provide a satisfactory servo operation.

What is claimed is:

1. A servo device in an apparatus for reading, recording or erasing information on an optical recording medium, the servo device comprising:

an optical head including means for emitting a light beam;

means for controlling an intensity level of the light beam, the controlling means operating in a first mode so that the light beam has a constant first intensity level, and a second mode so that the light beam has a second intensity level different than the first intensity level, the controlling means including means for changing operation between the first and second modes;

means for directing the emitted light beam via a prism to the optical recording medium to produce a light beam reflected by the optical recording medium;

means for detecting a variation in the intensity level of the reflected light beam and for generating a tracking error signal indicating a position deviation of the emitted light beam from a prescribed position;

means for moving the optical head in accordance with the error signal; and means for selectively applying an offset pulse to the error signal immediately before each change of operation between the first and second modes.

2. The servo device of claim 1, wherein the applying means includes means for applying the offset pulse having a polarity opposite to a polarity of the section of the error signal.

3. The servo device of claim 1, wherein the optical recording medium includes a magneto-optical disc.

4. A servo device in an apparatus for reading, recording or erasing information on an optical recording medium, the servo device comprising:

an optical head including means for emitting a light beam of variable intensity levels;

means for directing the emitted light beam via a prism to the optical recording medium to produce a light beam reflected by the optical recording medium;

means for detecting a variation in the intensity level of the reflected light beam and for generating a tracking error signal indicating a position deviation of the emitted light beam from a prescribed position;

means for moving the optical head in accordance with the error signal;

means for applying an offset pulse to the error signal, wherein a wobble signal including clock pulses and a block sync signal is recorded, together with track number information, on the optical recording medium on a sector-by-sector basis according to a predetermined format; and wherein the applying means comprises:

means for extracting the wobble signal from the tracking error signal;

means for detecting the block sync signal from the extracted wobble signal;

means for detecting the clock pulses from the extracted wobble signal;

means for generating a clock signal in phase-synchronism with the detected clock pulses;

means for generating a timing pulse based on the detected block sync signal and the clock signal; and means for applying the offset pulse to the tracking error signal in response to information indicating an operating mode change and in synchronism with the timing pulse.

5. A method of operating a servo device in an apparatus for reading, recording or erasing information on an optical recording medium, the apparatus including means for emitting a light beam, and means for directing the emitted light beam to the optical recording medium to produce a light beam reflected by the optical recording medium, the method comprising the steps of:

controlling an intensity level of the light beam, by operating in a first mode so that the light beam has a constant first intensity level, and a second mode so that the light beam has a second intensity level different than the first intensity level, the controlling step including the substep of changing operation between the first and second detecting a variation in the intensity level of the reflected light beam and generating a tracking error signal indicating a position deviation of the emitted light beam from a prescribed position;

controlling the directing means in accordance with the error signal; and selectively applying an offset pulse to the error signal immediately before each change in operation between the first and second modes.

6. A method of operating a servo device in an apparatus for reading, recording or erasing information on an optical recording medium, the apparatus including means for emitting a light beam of variable intensity levels, and means for directing the emitted light beam to the optical recording medium to produce a light beam reflected by the optical recording medium, the method comprising the steps of:

detecting a variation in the intensity level of the reflected light beam and generating a tracking error signal indicating a position deviation of the emitted light beam from a prescribed position;

controlling the directing means in accordance with the error signal;

applying an offset pulse to the error signal including the substeps of:

detecting a block sync signal and clock pulses from a wobble signal generated by the variation in the intensity level of the reflected light beam, generating a clock signal in phase synchronism with the detected block sync signal, and applying the offset pulse in synchronism with a timing pulse based on the detected block sync signal and the clock signal.

7. A servo device in an optical disc apparatus for reading, recording or erasing information on an optical recording medium on which a wobble signal including clock pulses and a block sync signal is recorded, together with track number information, on a sector-by-sector basis according to a predetermined format, the servo device comprising:

an optical head including a light source having a variable light output power that is controlled in accordance with an operation mode, and an optical system for introducing a light beam emitted from the light source via a beam shaping prism so that the light beam is input to a prescribed position of the optical recording medium in the form of a light spot and for extracting a light beam reflected by the optical recording medium;

means for detecting a variation in the intensity level of the reflected light beam and for generating a tracking error signal indicating a position deviation of the light spot from the prescribed position;

means for moving the optical head in accordance with the error signal; and means for applying an offset pulse to the error signal before the changeover of the operation mode, including means for extracting the wobble signal from the tracking error signal, means for detecting the block sync signal from the extracted wobble signal, means for detecting the clock pulses from the extracted wobble signal, means for generating a clock signal in the phase-synchronism with the detected clock pulses, means for generating a timing pulse based on the detected block sync signal and the clock signal at a time point when the light spot is located at a prescribed position in a sector of the optical recording medium, and means for applying the offset pulse to the tracking error signal in response to information indicating a change in operating mode and substantially in synchronism with the timing pulse.

* * * * *

UNITED STATES PATENT AND TRADEMARK OFFICE
CERTIFICATE OF CORRECTION

PATENT NO. : 5,508,991
DATED : April 16, 1996
INVENTOR(S) : Yoshio ONIGATA et al.

It is certified that error appears in the above-indentified patent and that said Letters Patent is hereby corrected as shown below:

Claim 5, column 7, line 55, after "second", insert --modes;--.

Signed and Sealed this

Nineteenth Day of November, 1996

*Attest:*

BRUCE LEHMAN

*Attesting Officer*         *Commissioner of Patents and Trademarks*